(12) United States Patent
Wang et al.

(10) Patent No.: US 9,843,615 B2
(45) Date of Patent: Dec. 12, 2017

(54) SIGNALING AND HANDLING OF FORENSIC MARKING FOR ADAPTIVE STREAMING

(71) Applicant: Futurewei Technologies, Inc., Plano, TX (US)

(72) Inventors: Xin Wang, Rancho Palos Verdes, CA (US); Yongliang Liu, Beijing (CN); Shaobo Zhang, Shenzhen (CN)

(73) Assignee: Futurewei Technologies, Inc., Plano, TX (US)

(*) Notice: Subject to any disclaimer, the term of this patent is extended or adjusted under 35 U.S.C. 154(b) by 200 days.

(21) Appl. No.: 14/754,093

(22) Filed: Jun. 29, 2015

(65) Prior Publication Data

US 2016/0006782 A1    Jan. 7, 2016

Related U.S. Application Data

(60) Provisional application No. 62/020,946, filed on Jul. 3, 2014.

(51) Int. Cl.
*G06F 15/173* (2006.01)
*H04L 29/06* (2006.01)
*H04L 29/08* (2006.01)

(52) U.S. Cl.
CPC ........ *H04L 65/601* (2013.01); *H04L 65/4084* (2013.01); *H04L 65/602* (2013.01);
(Continued)

(58) Field of Classification Search
USPC ........................................... 709/226
See application file for complete search history.

(56) References Cited

U.S. PATENT DOCUMENTS

2007/0012782 A1    1/2007   Winograd
2010/0325150 A1*  12/2010  Mordetsky .......... G06F 11/3409
                                            707/769
(Continued)

FOREIGN PATENT DOCUMENTS

EP           2835947 A1      2/2015
KR        20120106631 A      9/2012
WO        2013163932 A1     11/2013

OTHER PUBLICATIONS

Jarnikov et al., "A Watermarking System for Adaptive Streaming", 2014, pp. 6-8.*

(Continued)

*Primary Examiner* — Hee Soo Kim
(74) *Attorney, Agent, or Firm* — Conley Rose, P.C.

(57) ABSTRACT

A client device comprising a transmitter configured to transmit a client identifier and a media presentation description (MPD) request to a content server, and a processor operably coupled to a memory and the transmitter, wherein the memory comprises computer executable instructions stored in a non-transitory computer readable medium such that when executed by the processor causes the processor to receive an MPD file following transmission of the client identifier and the MPD request, wherein the MPD file assigns a base segment to at least two variant segments, transmit a segment request to the content server following receipt of the MPD file, and receive the base segment and one of the at least two variant segments from the content server following transmission of the segment request, wherein the one of the at least two variant segments corresponds to the client identifier.

20 Claims, 5 Drawing Sheets

(52) U.S. Cl.
CPC .......... *H04L 65/607* (2013.01); *H04L 65/608* (2013.01); *H04L 67/06* (2013.01)

(56) References Cited

U.S. PATENT DOCUMENTS

2014/0006564 A1    1/2014   Thang et al.
2015/0052259 A1    2/2015   Lian et al.

OTHER PUBLICATIONS

ISO/IEC 23009-1, 2013, All.*
"Information Technology—Dynamic Adaptive Streaming over HTTP (DASH)—Part 1: Media Presentation Description and Segment Formats," ISO/IEC 23009-1, Second Edition, 2013, 152 pages.
Dolan, et al., "Study of a Forensic Marking Framework for the ISOBMFF," International Organisation for Standardisation ISO/IEC JTC1/SC29/ WG11 Coding of Moving Pictures and Audio, ISO/IEC JTC1/SC29/WG11 MPEG2014/M33081, Apr. 2014, 16 pages.
Dolan, et al., "Text of DIS 23001-12-Draft," International Organisation for Standardisation ISO/IEC JTC1/SC29/WG11 Coding of Moving Pictures and Audio, ISO/IEC JTC1/SC29/WG11 MPEG2014/N14855, Oct. 2014, 22 pages.
"Information Technology—JPEG 2000 Image Coding System Part 12: ISO Base Media File Format," International Standard ISO/IEC 15444-12, Fifth Edition, Feb. 20, 2015, 289 pages.
Jarnikov, D., et al., "A Watermarking System for Adaptive Streaming," IEEE International Conference on Consumer Electronics, Feb. 28, 2014, 12 pages.
Foreign Communication From a Counterpart Application, PCT Application No. PCT/CN2015/038340, International Search Report dated Oct. 14, 2015, 5 pages.
Foreign Communication From a Counterpart Application, PCT Application No. PCT/CN2015/038340, Written Opinion dated Oct. 14, 2015, 8 pages.
"Information Technology—JPEG 2000 Image Coding System Part 12: ISO Base Media File Format," International Standard ISO/IEC 15444-12, Fifth Edition, Feb. 20, 2015, 274 pages.
Foreign Communication From a Counterpart Application, Korean Application No. 10-2016-7023503, Korean Office Action dated Sep. 28, 2017, 6 pages.
Foreign Communication From a Counterpart Application, Korean Application No. 10-2016-7023503, English Translation of Korean Office Action dated Sep. 28, 2017, 5 pages.

* cited by examiner

SIGNALING AND HANDLING OF FORENSIC MARKING FOR ADAPTIVE STREAMING

CROSS-REFERENCE TO RELATED APPLICATIONS

The present application claims the benefit of U.S. Provisional Patent Application No. 62/020,946 filed Jul. 3, 2014, by Xin Wang, et al., and entitled, "Method for Signaling and Handling of Forensic Marking for Adaptive Streaming," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver various media contents to subscribers or users using different encryption and/or coding schemes suited for different devices (e.g., televisions, laptops, desktop computers, and mobile handsets). The media content provider may support a plurality of media encoders and decoders (codecs), media players, video frame rates, spatial resolutions, bit rates, video formats, or combinations thereof. Source content may be converted from a source representation to various other representations to suit the different client devices. In adaptive streaming, the client device may select appropriate representations of media contents dynamically based on a variety of factors, such as network conditions, device capability, and user choice. The client device may also choose among various adaptation sets of the media contents according to user input, for example, enabling or disabling subtitles, or selecting a language.

SUMMARY

In one embodiment, the disclosure includes a client device comprising a transmitter configured to transmit a client identifier and a media presentation description (MPD) request to a content server, and a processor operably coupled to a memory and the transmitter, wherein the memory comprises computer executable instructions stored in a non-transitory computer readable medium such that when executed by the processor causes the processor to receive an MPD file following transmission of the client identifier and the MPD request, wherein the MPD file assigns a base segment to at least two variant segments, transmit a segment request to the content server following receipt of the MPD file, and receive the base segment and one of the at least two variant segments from the content server following transmission of the segment request, wherein the one of the at least two variant segments corresponds to the client identifier.

In another embodiment, the disclosure includes a content server comprising a receiver configured to receive a client identifier and an MPD request from a client device, and a processor operably coupled to a memory and the receiver, wherein the memory comprises computer executable instructions stored in a non-transitory computer readable medium such that when executed by the processor causes the processor to transmit an MPD file to the client device in response to the MPD request, wherein the MPD file assigns a base segment to at least two variant segments, receive a segment request from the client device following transmission of the MPD file, generate a single segment by combining the base segment and one of the at least two variant segments in response to the segment request, wherein the one of the at least two variant segments is selected based on the client identifier, and transmit the single segment to the client device following generation of the single segment.

In yet another embodiment, the disclosure includes a method implemented by a client device for forensic marking, the method comprising transmitting a client identifier and an MPD request to a content server, receiving an MPD file following transmission of the client identifier and the MPD request, wherein the MPD file assigns a base segment to at least two variant segments, transmitting a segment request for the base segment and one of the at least two variant segments from the client device following receipt of the MPD file, wherein the one of the at least two variant segments corresponds to the client identifier, and receiving the base segment and the one of the at least two variant segments from the content server following transmission of the segment request.

In yet another embodiment, the disclosure includes a method implemented by a content server for forensic marking, the method comprising receiving a client identifier and an MPD request from a client device, transmitting an MPD file to the client device in response to the MPD request, wherein the MPD file assigns a base segment to at least two variant segments, receiving a segment request for the base segment and one of the at least two variant segments from the client device following transmission of the MPD file, wherein the one of the at least two variant segments corresponds to the client identifier, and transmitting the base segment and the one of the at least two variant segments to the client device in response to the segment request.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
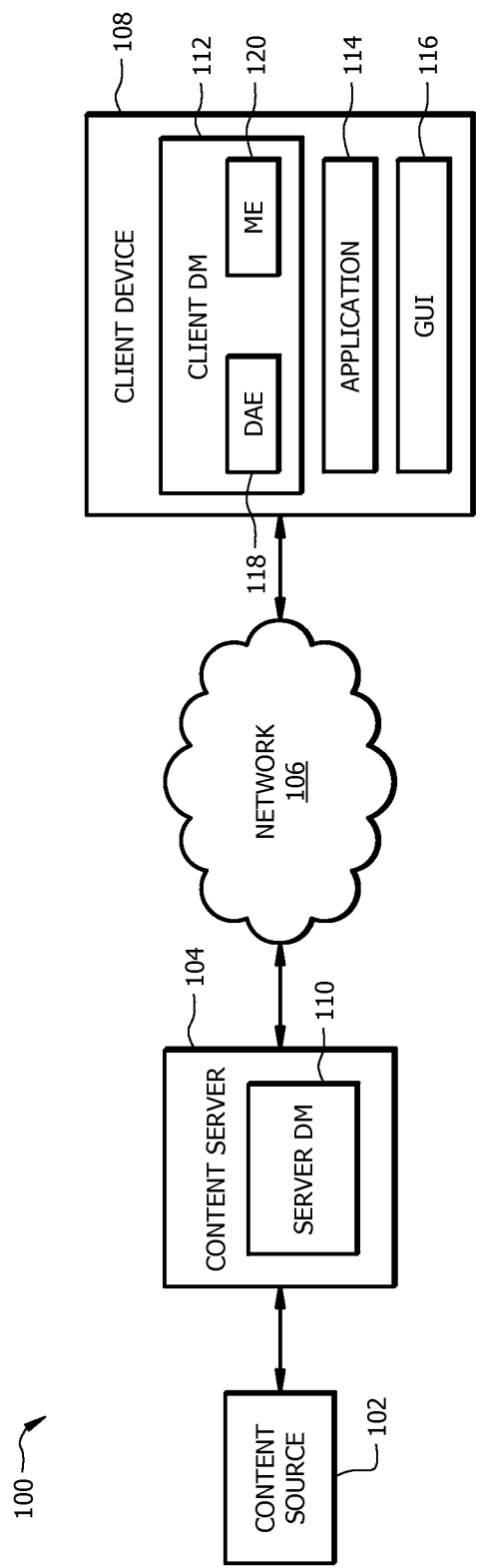
FIG. 1 is a schematic diagram of an embodiment of a dynamic adaptive streaming over hypertext transfer protocol (DASH) system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Media content (e.g., a movie or a song) streaming has become more and more popular. Preventing the media content from being distributed illegally is a priority for media content providers. One possible way is through identifying unauthorized clients who distribute the media content so that law enforcement may take appropriate actions to prevent the unauthorized clients from distributing the media content again. A forensic marking scheme is proposed to identify the unauthorized clients by detecting forensic marking as described in International Organization of Standardization (ISO)/International Electrotechnical Commission (IEC) Joint Technical Committee (JTC) 1/Subcommittee (SC) 29/Working Group (WG) 11, Moving Picture Experts Group (MPEG) 2014, M33081, "Coding of Moving Pictures and Audio," April 2014, which is incorporated herein by reference. The forensic marking scheme utilizes variances to modify samples of the media content. The variances are not perceptible to the viewers of the media content, but are detectable by forensic marking decoders. Each of the samples is defined as all the data associated with a time in ISO/IEC 15444-12, "Information Technology—JPEG 2000 Image Coding System—Part 12: ISO base media file format," fifth edition, Feb. 20, 2015, which is incorporated herein by reference. Each of the samples is composed of one or more segments, each of which is defined as a unit of data in ISO/IEC 23009-1, "Information Technology—Dynamic Adaptive Streaming over HTTP (DASH)—Part 1: Media Presentation Description and Segment Formats," second edition, 2013, which is incorporated herein by reference.

The forensic marking scheme requires all the variances assigned to a sample to be transmitted when the sample is transmitted. As a result, significant delivery redundancy and delays are introduced. Therefore, the forensic marking scheme is not suitable for adaptive streaming. Further, no existing forensic marking schemes describe signaling and handling of forensic marking in adaptive streaming.

Disclosed herein are various embodiments for signaling and handling of forensic marking in adaptive streaming of media content. The media content is comprised of a plurality of samples, each of which comprises one or more segments. For each of the segments selected for forensic marking, a content server generates a segment set comprising a base segment and at least two variant segments. The base segment is assigned to the at least two variant segments in a media presentation description (MPD) file. The client device transmits a segment request to the content server. In an embodiment, the content server determines a selected variant segment from the at least two variant segments, combines the base segment and the selected variant segment to form a single segment, and transmits the single segment to the client device. In an embodiment, the client device determines the selected variant segment and requests the base segment and the selected variant segment through the segment request. After receipt of the base segment and the selected variant segment from the content server, the client device combines the base segment and the selected variant segment to form the single segment. The selected variant segment corresponds to a client identifier of the client device. In an embodiment, the client identifier is a sequence of binary bits.

FIG. 1 is a schematic diagram of an embodiment of a DASH system 100. The DASH system 100 comprises a content source 102, a content server 104, a network 106, and a client device 108. While one client device 108 is illustrated in FIG. 1, more than one client device may be included in the DASH system 100 in practical applications. In an embodiment, the content server 104 and the client device 108 are in communication with each other via the network 106 to, for example, exchange data. Additionally, the content server 104 may be in communication with the content source 102 to, for example, exchange data. While one content source 102 and one content server 104 are illustrated in FIG. 1, more than one content source and/or more than one content server may be included in the DASH system 100 in practical applications. Also, despite the use of the term DASH throughout the disclosure, the inventive concept disclosed herein is applicable to any adaptive streaming, such as HTTP Live Streaming (HLS), Microsoft Smooth Streaming, or Internet Information Services (IIS). Indeed, the inventive concept should not be constrained to only third generation partnership (3GP)-DASH or MPEG-DASH.

The content source 102 is a media content provider or distributor configured to deliver various media content to subscribers or users using different encryption and/or coding schemes suited for different devices (e.g., television, laptops, and/or mobile handsets). The content source 102 is configured to support a plurality of media encoders and/or decoders (e.g., codecs), media players, video frame rates, spatial resolutions, bit-rates, video formats, or combinations thereof. Media content may be converted from a source or original presentation to various other representations (e.g., versions at different resolutions or bit rates) to suit different users.

The content server 104 is in communication with the client device 108 via HTTP or another suitable protocol. The content server 104 is configured to store media content (e.g., in a memory or cache) and/or to forward media content segments. Each segment may be encoded in a plurality of representations. In an embodiment, the content server 104 comprises a server DASH module (DM) 110 configured to send and receive data via HTTP or another suitable protocol. In one embodiment, the content server 104 is a network node such as, for example, a computer server or a workstation. In an embodiment, the content server 104 forms a portion of a content delivery network (CDN), which may refer to a distribution system of servers, deployed in multiple data centers over multiple backbones for the purpose of delivering content. A CDN may comprise one or more content servers 104. Although FIG. 1 illustrates a content server 104, other servers such as origin servers, web servers, and/or any other suitable type of server may store media content.

The network 106 comprises any network configured to permit communication (e.g., the exchange of data) between the content server 104 and the client device 108 along wired and/or wireless channels. For example, the network 106 may be an internet or mobile telephone network.

The client device 108 is any network node, for example, a hardware device configured to communicate with the content server 104 via HTTP or other suitable protocol. A client device 108 may be a laptop, a tablet computer, a desktop computer, a mobile telephone, or any other device. The client device 108 is configured to parse an MPD file to retrieve information regarding the media contents, such as timing of the program, availability of media content, media types, resolutions, minimum and/or maximum bandwidths, existence of various encoded alternatives of media components, accessibility features and required DRM, location of each media component (e.g., audio data segments and video data segments) on the network, and/or other characteristics of the media content. As will be more fully explained below, the client device 108 is also configured to select an appropriate encoded version of the media content according to the information retrieved from the MPD file and to stream the media content by fetching media segments located on the content server 104. A media segment may comprise audio and/or visual samples from the media content.

In an embodiment, the client device 108 comprises a client DM 112, an application 114, and a graphical user interface (GUI) 116. The client DM 112 is configured to send and receive data via HTTP and a DASH protocol (e.g., ISO/IEC 23009-1). The client DM 112 may comprise a DASH access engine (DAE) 118 and a media output (ME) 120. The DAE 118 is configured as the primary component for receiving raw data from the content server 104 (e.g., the server DM 110) and constructing the data into a format for viewing. For example, the DAE 118 may format the data in MPEG container formats along with timing data, then output the formatted data to the ME 120. The ME 120 is responsible for initialization, playback, and other functions associated with the media content and may output that media content to the application 114.

In an embodiment, the application 114 is a web browser or other application with an interface configured to download and present media contents. The application 114 is coupled to the GUI 116 so that a user associated with the client device 108 may view the various functions of the application 114. In an embodiment, the application 114 is a media player, which comprises a search bar so that the user is able to input a string of words to search for media content such as a movie. The application 114 presents a list of search hits, and the user may select the desired media content among the hits. Upon selection, the application 114 sends instructions to the client DM 112 for downloading the media content. The client DM 112 downloads the media content and processes the media content for outputting to the application 114. For example, the application 114 may provide instructions to the GUI 116 for the GUI 116 to display a progress bar showing the temporal progress of the media content. The GUI 116 may be any GUI configured to display functions of the application 114 so that the user may operate the application 114. As described above, the GUI 116 will display the various functions of the application 114 so that the user may select content to download. The GUI 116 will then display the media content for viewing by the user.

When employing the DASH system 100, a media content provider will, upon request, transmit an MPD file to a client. In an embodiment, the MPD file is an extensible markup language (XML) document and that describes media content as segments and how such segments will be utilized to present the media content to a user. For example, the MPD file describes segment timing, segment multiplexing (e.g., interrelation between audio segment and video segment timings), and uniform resource locator (URL) information indicating where such segments may be obtained. For example, streamed media content may comprise several media components (e.g., audio, video, and text), each having different characteristics specified in the MPD file.

Figure 2:
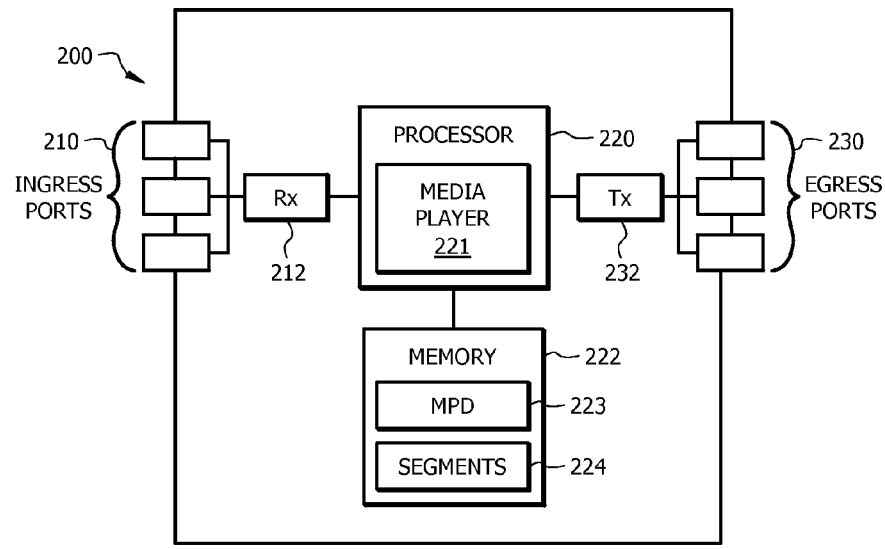
FIG. 2 is a schematic diagram of an embodiment of a network element (NE).

FIG. 2 is a schematic diagram of an embodiment of a network element (NE) 200 suitable for implementing the disclosed embodiments. The NE 200 may be any device (e.g., a modem, a switch, router, bridge, server, client, controller, etc.) that transports or assists with transporting data and segments thereof through a network, system, and/or domain. In an embodiment, the NE 200 is in and/or integrated within the content server 104 and the client device 108. The NE 200 comprises one or more ingress ports 210 coupled to a receiver 212 (Rx). The ingress ports 210 and receiver 212 are configured to receive MPD files and/or segments from other network components. The NE 200 further comprises one or more egress ports 230 coupled to a transmitter (Tx) 232. The egress ports 230 and the transmitter 232 are configured to transmit the MPD files and/or segments to other network components. The NE 200 further comprises a logic unit or processor 220 coupled to the receiver 212. The processor 220 is configured to process the segments or otherwise determine to which network components to send the segments.

The processor 220 may be implemented using hardware or a combination of hardware and software. The processor 220 may be implemented as one or more central processor unit (CPU) chips, cores (e.g., a multi-core processor), field-programmable gate arrays (FPGAs), application specific integrated circuits (ASICs), and/or digital signal processors (DSPs). The processor 220 is configured to implement a media player 221 or any functional component known by one of ordinary skill in the art, or any combinations thereof. In an embodiment, the media player 221 is an application running on the processor 220 and configured to play decoded media segments.

The NE 200 further comprises at least one memory 222. The memory 222 may be volatile and non-volatile and may be read-only memory (ROM), random-access memory (RAM), ternary content-addressable memory (TCAM), and static random-access memory (SRAM). The memory 222 is configured to store MPD files 223 and segments 224. The MPD files 223 and the segments 224 may be stored or packed in various forms as further described below. As shown in FIG. 2, the segments 224 and the MPD files 223 are stored as separate files, but they may also be stored in a single file. In practice, there may be bidirectional traffic processed by the NE 200, thus some ports may both receive and transmit packets (e.g., segments). In this sense, the ingress ports 210 and egress ports 230 may be co-located or may be considered different functionalities of the same ports that are coupled to transceivers (Rx/Tx).

It is understood that, by programming and/or loading executable instructions onto the NE 200, at least one of the processor 220 and the memory 222 are changed. As a result, the NE 200 is transformed in part into a particular machine or apparatus (e.g., a network router having the functionality taught by the present disclosure). The executable instructions are stored on the memory 222 and loaded into the processor 220 for execution.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 3:
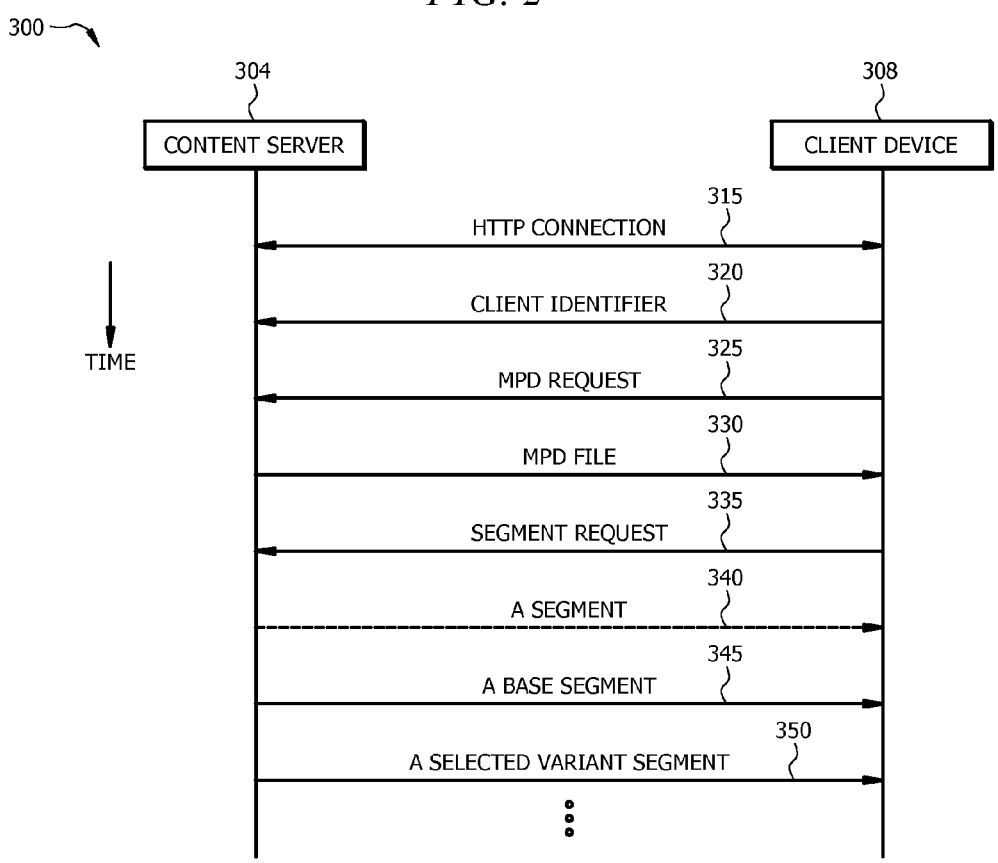
FIG. 3 is a protocol diagram illustrating forensic marking in adaptive streaming according to an embodiment of the disclosure.

FIG. 3 is a protocol diagram 300 illustrating forensic marking in adaptive streaming according to an embodiment of the disclosure. The method shown by the protocol diagram 300 is implemented when a user requests media streaming services to add forensic marking on a segment. The protocol diagram 300 may be implemented in the DASH system 100. The protocol diagram 300 illustrates message exchanges between a content server 304 (e.g., the content server 104) and a client device 308 (e.g., the client device 108).

The content server 304 and the client device 308 establish an HTTP connection 315. Thereafter, the client device 308 transmits a client identifier 320 and an MPD request 325 to the content server 304. The orders of transmitting the client identifier 320 and the MPD request 325 are interchangeable. The client identifier 320 is a unique sequence of binary bits that differentiates the client device 308 from other client devices.

In response to the MPD request 325, the content server 304 transmits an MPD file 330 to the client device 308 via one of the various types of data transport, for example HTTP secure (HTTPS), email, or universal serial bus (USB) drives. In one embodiment, the content server 304 transmits the MPD file 330 to the client device 308 via a DASH protocol. The MPD file 330 describes segment information (e.g, timing, media characteristics like resolution and bit rates) of media content for adaptive streaming. The media content may be a video, an audio, or a text. The media content is comprised of a plurality of samples, each of which is comprised of one or more segments.

Among all the segments of the media content that are to be transmitted to the client device 308, the content server 304 identifies special segments for forensic marking. For each special segment, the content server 304 generates a segment set which comprises a base segment and at least two variant segments. The MPD file 330 assigns the base segment to the at least two variant segments. The base segment is perceptible to the viewers of the media content. The at least two variant segments are generated for forensic marking, which are not perceptible to the viewers of the media content, but are detectable by the forensic marking decoders.

Figure 4:
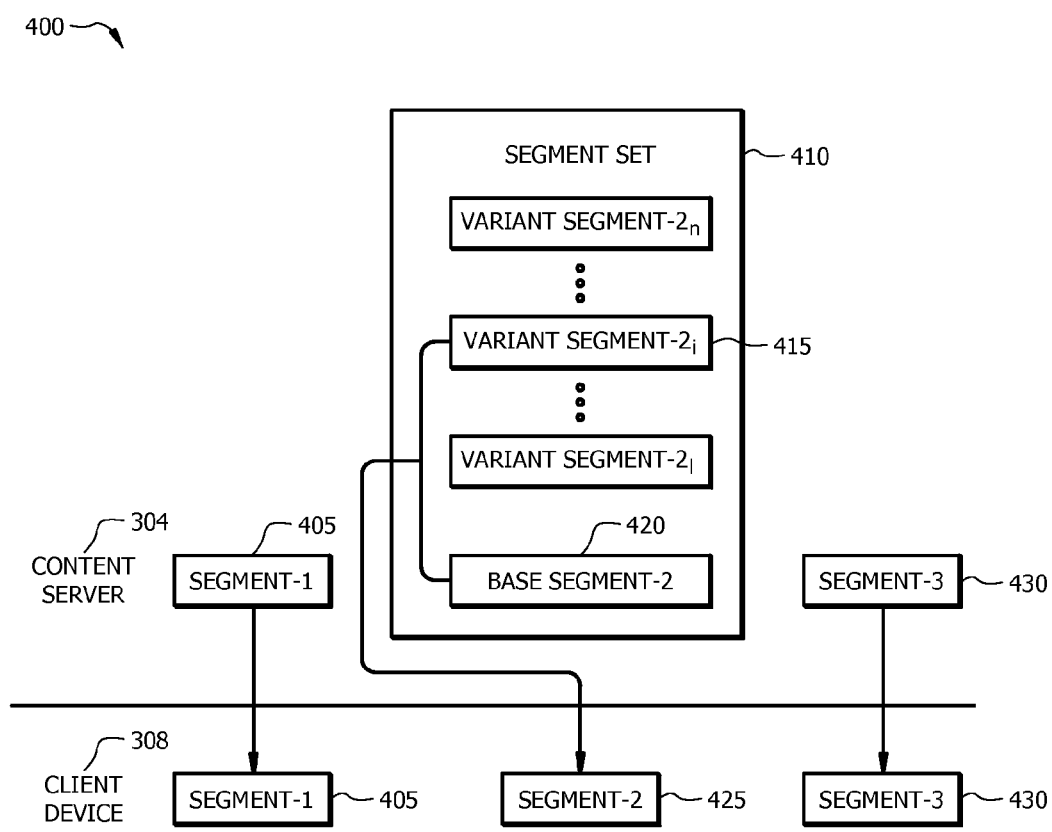
FIG. 4 shows different segment structures according to an embodiment of the disclosure.

FIG. 4 shows different segment structures 400 according to an embodiment of the disclosure. The content server 304 will transmit Segment-1 405, Segment-2 425, and Segment-3 430 to the client device 308. Unlike Segment-1 405 and Segment-3 430, Segment-2 425 is a special segment for forensic marking. Thus, the content server 304 generates a segment set 410, which comprises base segment-2 420 and variant segments-$2_{1-n}$ (collectively denoted as n variant segments 415), where n is a positive integer greater than 1. The MPD file 330 assigns base segment-2 420 to the n variant segments 415 (i.e., the variant segments-$2_{1-n}$).

Returning to FIG. 3, the client device 308 transmits a segment request 335 to the content server 304. When the segment request 335 asks for a segment 340 (e.g., Segment-1 405 or Segment-3 430) which is not one of the special segments, the content server 304 authorizes and transmits the segment 340 directly to the client device 308.

When the segment request 335 asks for a special segment (e.g., Segment-2 425), two embodiments to handle the request are presented in this disclosure. In one embodiment, the content server 304 determines a selected variant segment 350 (e.g., variant segment-2, 415) from the at least two variant segments (e.g., the n variant segments 415) after receipt of the segment request 335, combines the base segment 345 (e.g., base segment-2 420) and the selected variant segment 350 (e.g., the n variant segments 415) to form a single segment (e.g., Segment-2 425), and transmits the single segment (e.g., Segment-2 425) to the client device 308. The content server 304 and the client device 308 continue to exchange messages in a similar way as described above.

In the other embodiment, the client device 308 determines the selected variant segment 350 (e.g., variant segment-2, 415) from the at least two variant segments (e.g., the n variant segments 415) and requests the base segment 345 (e.g., base segment-2 420) and the selected variant segment 350 (e.g., variant segment-2, 415) in the segment request 335. After receipt of the base segment 345 and the selected variant segment 350 from the content server 304, the client device 308 combines the base segment 345 and the selected variant segment 350 to form a single segment (e.g., Segment-2 425) for adaptive streaming. The content server 304 and the client device 308 continue to exchange messages in a similar way as described above.

In both embodiments described above, the selected variant segment 350 is determined according to a pre-defined rule based on the client identifier. In one embodiment, the client identifier is a sequence of binary bits. The minimum number of bits required in the client identifier depends on the number of variant segments assigned to each base segment, the number of the special segments for forensic marking in the media content, and the total number of potential client devices. For example, when each base segment is assigned to two variant segments including a first variant segment and a second variant segment, the media content comprises only one special segment for forensic marking, and the total number of client devices is not greater than 2, the client identifier should comprise at least one binary bit, i.e., either bit "0" or bit "1". In one embodiment, the pre-defined rule may define that bit "0" means selecting the first variant segment, and bit "1" means selecting the second variant segment. For another example, when each base segment is assigned to four variant segments including a first variant segment, a second variant segment, a third variant segment, and a fourth variant segment, the media content comprises two special segments for forensic marking, the potential client devices is not greater than 16, and the client identifier comprises at least four binary bits. As such, the first two bits of the client identifier correspond to the selection of a variant segment for the first special segment, and the last two bits of the client identifier correspond to the selection of a variant segment for the second special segment. In one embodiment, the pre-defined rule may define that "00" corresponds to the first variant segment, "01" corresponds to the second variant segment, "10" corresponds to the third variant segment, and "11" corresponds to the fourth variant segment. For example, when the client identifier is "0011", the first two bits "00" indicates selecting the first variant segment for the first special segment, and the last two bits "11" indicates selecting the fourth variant segment for the second special segment.

Figure 5:
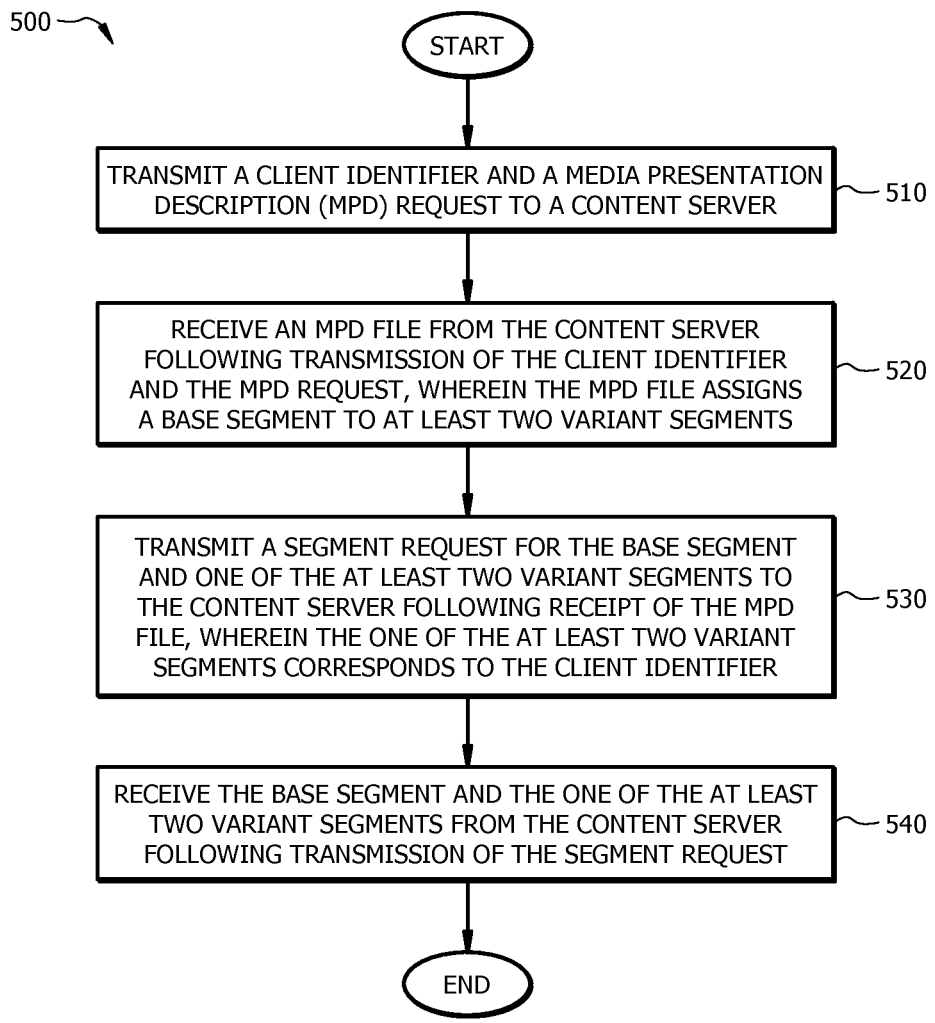
FIG. 5 is a flowchart illustrating a method for forensic marking in adaptive streaming according to an embodiment of the disclosure.

FIG. 5 is a flowchart illustrating a method 500 for forensic marking in adaptive streaming according to an embodiment of the disclosure. The method 500 is performed in a client device (e.g., the client device 108 or the client device 308). The method 500 is implemented in order to add forensic marking on a segment when a user requests media streaming services.

At step 510, a client identifier and an MPD request are transmitted to a content server (e.g., the content server 104 or the content server 304). At step 520, an MPD file is received from the content server following transmission of the client identifier and the MPD request. The MPD file assigns a base segment to at least two variant segments. At step 530, a segment request for the base segment and one of the at least two variant segments is transmitted to the content server following receipt of the MPD file. The one of the at least two variant segments corresponds to the client identifier. At step 540, the base segment and the one of the at least two variant segments are received from the content server following transmission of the segment request.

Figure 6:
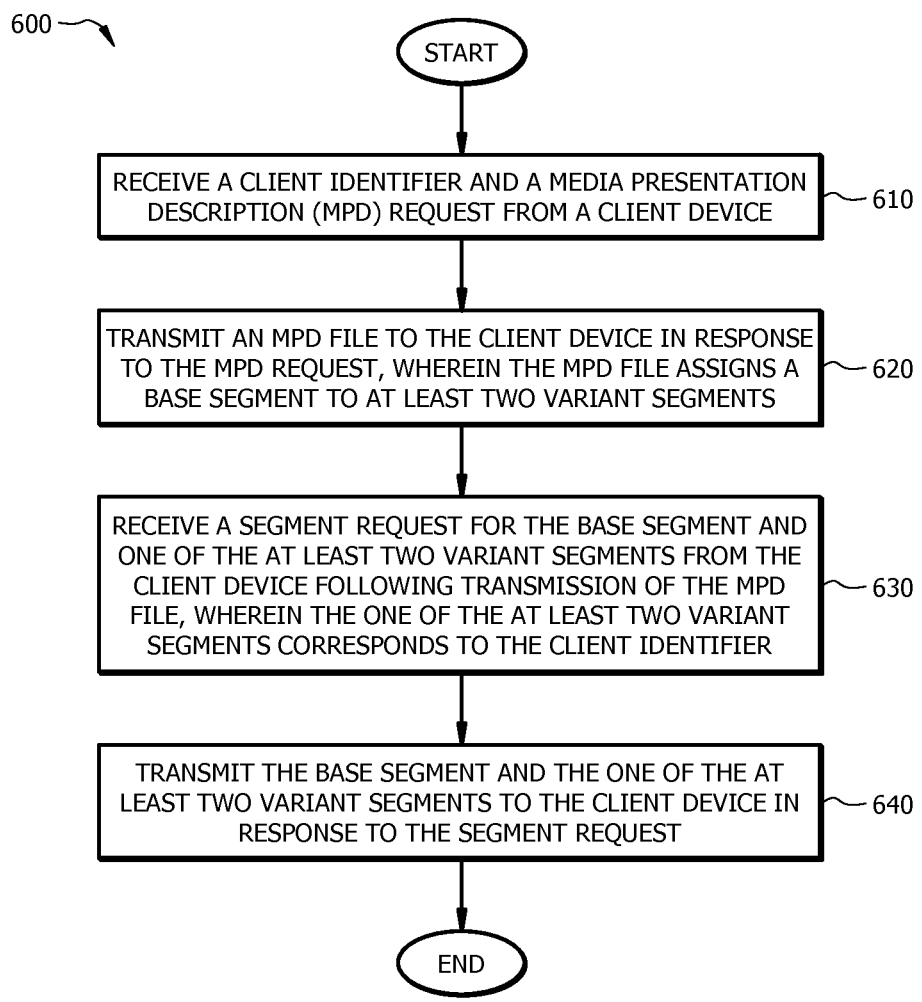
FIG. 6 is a flowchart illustrating another method for forensic marking in adaptive streaming according to an embodiment of the disclosure.

FIG. 6 is a flowchart illustrating another method 600 for forensic marking in adaptive streaming according to an embodiment of the disclosure. The method 600 is performed in a content server (e.g., the content server 104 or the content server 304). The method 600 is implemented in order to add forensic marking on a segment when a user requests media streaming services.

At step 610, a client identifier and an MPD request from a client device are received from a client device (e.g., the client device 108 or the client device 308). At step 620, an MPD file is transmitted to the client device in response to the MPD request. The MPD file assigns a base segment to at least two variant segments. At step 630, a segment request for the base segment and one of the at least two variant segments is received from the client device following transmission of the MPD file. The one of the at least two variant segments corresponds to the client identifier. At step 640, the base segment and the one of the at least two variant segments are transmitted to the client device in response to the segment request.

Below are exemplary MPD files written in XML codes to illustrate their potential uses in some use cases. Although two exemplary use cases (use cases 1-2 and Tables 1-2) are described in this disclosure, it should be understood that these examples are non-limiting. In both use cases, a base segment is assigned to two variant segments including a first variant segment and a second variant segment. The base segment, the first variant segment, and the second variant segment are defined in a first adaptation set, a second adaptation set, and a third adaptation set, respectively.

In use case 1, the first adaptation set, the second adaptation set, and the third adaptation set are the same. Table 1 shows an exemplary implementation of an MPD file in the XML codes for use case 1. Lines 19-25 define the base segment. Line 19 indicates identification (ID) of the base segment is "BR1". Lines 20-24 define total time duration of 3 segments is 30 second (s), including the first segment, the base segment, and the third segment in a chronological order. By default, each of the three segments has the same time duration and the starting time of the first segment is at 0 s. Therefore, the first segment, linked to an MPEG-4 (MP4) media of "seg-1.mp4" is active from 0 s to 9 s. Subsequently, the base segment, linked to an MP4 media of "seg-bs-2.mp4" is active from 10 s to 19 s. The third segment, linked to an MP4 media of "seg-3.mp4" is active from 20 s to 29 s.

Lines 28-32 define the first variant segment. Line 28 indicates ID of the first variant segment is "VR0", which is assigned to "BR1". Line 29 defines time duration of "VR0" is 10 s, and the starting time of "VR0" is at 10 s. Therefore, "VR0" is active from 10 s to 19 s, which is coincident with "BR1". Line 30 indicates "VR0" is linked to an MP4 media of "seg-VS-20.mp4."

Lines 35-39 define the second variant segment. Line 35 indicates ID of the second variant segment is "VR1", which is assigned to "BR1". Line 36 defines time duration of "VR1" is 10 s and the starting time of "VR1" is at 10 s. Therefore, "VR1" is active from 10 s to 19 s, which is coincident with "BR1." Line 37 indicates "VR1" is linked to an MP4 media of "seg-VS-21.mp4."

TABLE 1

An exemplary implementation of an MPD file written in XML codes.

| | |
|---|---|
| 1 | <?xml version="1.0" encoding="UTF-8"?> |
| 2 | <MPD |
| 3 |   xmlns:xsi="http://www.w3.org/2001/XMLSchema-instance" |
| 4 |   xmlns="urn:mpeg:dash:schema:mpd:2011" |
| 5 |   xsi:schemaLocation="urn:mpeg:dash:schema:mpd:2011 DASH-MPD.xsd" |
| 6 |   type="static" |
| 7 |   mediaPresentationDuration="PT3256S" |
| 8 |   minBufferTime="PT10.00S" |
| 9 |   profiles="urn:mpeg:dash:profile:isoff-on-demand:2011"> |
| 10 |   <BaseURL>http://cdn1.example.com/</BaseURL> |

TABLE 1-continued

An exemplary implementation of an MPD file written in XML codes.

```
11      <BaseURL>http://cdn2.example.com/</BaseURL>
12      <!--In this Period the stream containing 2 catagories of forensic marking is split into three
13   representations:BaseRepresentation1(BR1),VariantRepresentation0(VR0), VariantRepresentation1(VR1).
14   BR1+VR0 and BR1+VR1 each form a segment representation with forensic marking but VR0+VR1 does
15   not -->
16      <Period>
17       <AdaptationSet>
18         <!-- Representation containing base segment -->
19          <Representation id="BR1" bandwidth="512000">
20            <SegmentList duration="30">
21               <SegmentURL media="seg-1.mp4"/>
22               <SegmentURL media="seg-bs-2.mp4"/>
23               <SegmentURL media="seg-3.mp4"/>
24            </SegmentList>
25          </Representation>
26          <!-Representation containing first category of variant segment whose decoding depends on base
27   representation -->
28          <Representation id="VR0" dependencyId="BR1" bandwidth="512000">
29            <SegmentList duration="10" presentationTimeOffset="10" >
30               <SegmentURL media="seg-VS-20.mp4"/>
31            </SegmentList>
32          </Representation>
33          <!-- Representation containing second category of variant segment whose decoding depends on
34   base representation -->
35          <Representation id="VR1" dependencyId="BR1" bandwidth="512000">
36            <SegmentList duration="10" presentationTimeOffset="10" >
37               <SegmentURL media="seg-VS-21.mp4"/>
38            </SegmentList>
39          </Representation>
40       </AdaptationSet>
41      </Period>
42   </MPD>
```

In use case 2, the first adaptation set is different from the second adaptation set, and the third adaptation set is different from the first adaptation set and the second adaptation set. Table 2 shows an exemplary implementation of an MPD file in the XML codes for use case 2. Lines 16-25 define the base segment in the first adaptation set. Lines 16-25 in Table 2 are similar to lines 19-25 in Table 1 except line 18 is inserted in Table 2. Line 18 defines a new role for the base segment whose scheme user resource identification (URI) specifies a forensic marking scheme.

Lines 26-33 define the first variant segment in the second adaptation set. Lines 26-33 in Table 2 are similar to lines 28-32 in Table 1 except line 27 is inserted in Table 2. Line 27 defines a new role for the first variant segment whose scheme URI specifies the forensic marking scheme.

Lines 34-41 define the second variant segment in the third adaptation set. Lines 34-41 are similar to lines 35-39 in Table 1 except line 35 is inserted in Table 2. Line 35 defines a new role for the second variant segment whose scheme URI specifies the forensic marking scheme.

TABLE 2

An exemplary implementation of another MPD file in the XML codes.

```
1    <?xml version="1.0" encoding="UTF-8"?>
2    <MPD
3      xmlns:xsi="http://www.w3.org/2001/XMLSchema-instance"
4      xmlns="urn:mpeg:dash:schema:mpd:2011"
5      xsi:schemaLocation="urn:mpeg:dash:schema:mpd:2011 DASH-MPD.xsd"
6      type="static"
7      mediaPresentationDuration="PT3256S"
8      minBufferTime="PT10.00S"
9      profiles="urn:mpeg:dash:profile:isoff-on-demand:2011">
10      <BaseURL>http://cdn1.example.com/</BaseURL>
11      <BaseURL>http://cdn2.example.com/</BaseURL>
12      <!--In this Period the stream containing 2 catagories of forensic marking is split into three
13   representations: BR1, VR0, VR1. BR1+VR0 and BR1+VR1 each form a segment representation with
14   forensic marking but VR0+VR1 does not -->
15      <Period>
16       <AdaptationSet>
17        <Representation id="BR1" bandwidth="512000">
18          <Role: schemeIdUri="urn:mpeg:dash:forensicmarkingid:2014" value="br1">
19            <SegmentList duration="30">
20               <SegmentURL media="seg-1.mp4"/>
21               <SegmentURL media="seg-bs-2.mp4"/>
22               <SegmentURL media="seg-3.mp4"/>
23            </SegmentList>
24          </Representation>
25       </AdaptationSet>
```

TABLE 2-continued

An exemplary implementation of another MPD file in the XML codes.

```
26      <AdaptationSet>
27        <Role: schemeIdUri="urn:mpeg:dash:forensicmarkingid:2014" value="vr0">
28          <Representation id="VR0" dependencyId="BR1" bandwidth="512000">
29            <SegmentList duration="10" presentationTimeOffset="10" >
30              <SegmentURL media="seg-VS-20.mp4"/>
31            </SegmentList>
32          </Representation>
33        </AdaptationSet>
34      <AdaptationSet>
35        <Role: schemeIdUri="urn:mpeg:dash:forensicmarkingid:2014" value="vr1">
36          <Representation id="VR1" dependencyId="BR1" bandwidth="512000">
37            <SegmentList duration="10" presentationTimeOffset="10" >
38              <SegmentURL media="seg-VS-21.mp4"/>
39            </SegmentList>
40          </Representation>
41        </AdaptationSet>
42      </Period>
43    </MPD>
```

In an embodiment, the variant segments (e.g., the n variant segments 415 in FIG. 4) are grouped into a single segment. Each of the variant segments may be identified by either attribute "@HTTP-URL" or attribute "@byte range" defined in an MPD file. For example, a variant segment is linked to an HTTP URL, which is specified by the attribute "@HTTP-URL". For another example, the variant segment is identified by a group of consecutive bytes which are specified by the attribute "@byte range". In one embodiment, the attribute "@byte range" comprises child attribute "@startNum" and child attribute "@length". The child attribute "@startNum" specifies the index number of the first byte in the group of the consecutive bytes. The child attribute "@length" specifies the number of bytes in the group of the consecutive bytes.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A client device comprising:
a transmitter configured to transmit a client identifier and a media presentation description (MPD) request to a content server; and
a processor operably coupled to the transmitter and configured to:

receive an MPD file following transmission of the client identifier and the MPD request, wherein the MPD file assigns a base segment to at least two variant segments when the MPD request identified a special segment for forensic marking instead of a common segment;
instruct the transmitter to transmit a segment request to the content server following receipt of the MPD file; and
receive the base segment and one of the at least two variant segments from the content server following transmission of the segment request, wherein the one of the at least two variant segments corresponds to the client identifier.

2. The client device of claim 1, wherein the client identifier comprises a sequence of binary bits.

3. The client device of claim 1, wherein the base segment is defined in a first adaptation set in the MPD file, wherein a first variant segment of the at least two variant segments is defined in a second adaptation set in the MPD file, wherein a second variant segment of the at least two variant segments is defined in a third adaptation set in the MPD file, and wherein the second adaptation set is the same as the third adaptation set.

4. The client device of claim 3, wherein the first adaptation set is the same as the second adaptation set and the third adaptation set.

5. The client device of claim 1, wherein the base segment is defined in a first adaptation set in the MPD file, wherein a first variant segment of the at least two variant segments is defined in a second adaptation set in the MPD file, wherein a second variant segment of the at least two variant segments is defined in a third adaptation set in the MPD file, and wherein the second adaptation set is different from the third adaptation set.

6. The client device of claim 5, wherein the first adaptation set is different from the second adaptation set and the third adaptation set.

7. The client device of claim 1, wherein the processor is further configured to receive the base segment and the one of the at least two variant segments from the content server via a dynamic adaptive streaming over hypertext transfer protocol (DASH).

8. A content server comprising:
a receiver configured to receive a client identifier and a media presentation description (MPD) request from a client device; and a processor operably coupled to the receiver and configured to:
transmit an MPD file to the client device in response to the MPD request, wherein the MPD file assigns a base segment to at least two variant segments when the MPD request identified a special segment for forensic marking instead of a common segment;
receive a segment request from the client device following transmission of the MPD file;
generate a single segment by combining the base segment and one of the at least two variant segments in response to the segment request, wherein the one of the at least two variant segments is selected based on the client identifier; and
transmit the single segment to the client device following generation of the single segment.

9. The content server of claim 8, wherein the client identifier comprises a sequence of binary bits.

10. The content server of claim 8, wherein the base segment is defined in a first adaptation set in the MPD file, wherein a first variant segment of the at least two variant segments is defined in a second adaptation set in the MPD file, wherein a second variant segment of the at least two variant segments is defined in a third adaptation set in the MPD file, and wherein the second adaptation set is the same as the third adaptation set.

11. The content server of claim 10, wherein the first adaptation set is the same as the second adaptation set and the third adaptation set.

12. The content server of claim 8, wherein the base segment is defined in a first adaptation set in the MPD file, wherein a first variant segment of the at least two variant segments is defined in a second adaptation set in the MPD file, wherein a second variant segment of the at least two variant segments is defined in a third adaptation set in the MPD file, and wherein the second adaptation set is different from the third adaptation set.

13. The content server of claim 12, wherein the first adaptation set is different from the second adaptation set and the third adaptation set.

14. The content server of claim 8, further comprising a transmitter configured to transmit the single segment to the client device via a dynamic adaptive streaming over hypertext transfer protocol (DASH).

15. A method implemented by a client device for forensic marking, the method comprising:
transmitting a client identifier and a media presentation description (MPD) request to a content server;
receiving an MPD file from the content server following transmission of the client identifier and the MPD request, wherein the MPD file assigns a base segment to at least two variant segments when the MPD request identified a special segment for the forensic marking instead of a common segment;
transmitting a segment request for the base segment and one of the at least two variant segments to the content server following receipt of the MPD file, wherein the one of the at least two variant segments corresponds to the client identifier; and
receiving the base segment and the one of the at least two variant segments from the content server following transmission of the segment request.

16. The method of claim 15, further comprising generating a single segment by combining the base segment and the one of the at least two variant segments following receipt of the base segment and the one of the at least two variant segments.

17. The method of claim 15, wherein the client identifier comprises a sequence of binary bits.

18. A method implemented by a content server for forensic marking, the method comprising:
receiving a client identifier and a media presentation description (MPD) request from a client device;
transmitting an MPD file to the client device in response to the MPD request, wherein the MPD file assigns a base segment to at least two variant segments when the MPD request identified a special segment for the forensic marking instead of a common segment;
receiving a segment request for the base segment and one of the at least two variant segments from the client device following transmission of the MPD file, wherein the one of the at least two variant segments corresponds to the client identifier; and
transmitting the base segment and the one of the at least two variant segments to the client device in response to the segment request.

19. The method of claim 18, wherein the client identifier comprises a sequence of binary bits.

20. The method of claim 18, wherein the base segment is defined in a first adaptation set in the MPD file, wherein a first variant segment of the at least two variant segments is defined in a second adaptation set in the MPD file, wherein a second variant segment of the at least two variant segments is defined in a third adaptation set in the MPD file, wherein the second adaptation set is different from the third adaptation set, and wherein the first adaptation set is different from the second adaptation set and the third adaptation set.

* * * * *